United States Patent [19]

Epperly et al.

[11] Patent Number: 4,877,591

[45] Date of Patent: Oct. 31, 1989

[54] PROCESS FOR THE REDUCTION OF NITROGEN OXIDES IN AN EFFLUENT USING SUGAR

[75] Inventors: William R. Epperly, New Canaan; James C. Sullivan, Southport, both of Conn.

[73] Assignee: Fuel Tech, Inc., Stamford, Conn.

[21] Appl. No.: 25,350

[22] Filed: Mar. 13, 1987

[51] Int. Cl.$^4$ .............................................. C01B 21/00
[52] U.S. Cl. ..................................................... 423/235
[58] Field of Search ......................................... 423/235

[56] References Cited

U.S. PATENT DOCUMENTS

| | | | |
|---|---|---|---|
| 4,212,853 | 7/1980 | Fukui | 423/235 |
| 4,350,669 | 9/1982 | Izumi et al. | 423/235 |
| 4,400,362 | 8/1983 | Lerner | 423/235 |
| 4,731,233 | 3/1988 | Thompson et al. | 423/239 |
| 4,751,065 | 6/1988 | Bowers | 423/235 |
| 4,770,863 | 9/1988 | Epperly et al. | |

FOREIGN PATENT DOCUMENTS 55-49130  4/1980  Japan .

Primary Examiner—John Doll
Assistant Examiner—Wayne A. Langel
Attorney, Agent, or Firm—St. Onge Steward Johnston & Reens

[57] ABSTRACT

A process is presented for the reduction of nitrogen oxides in the effluent from the combustion of a carbonaceous fuel. The process comprises injecting a treatment agent comprising sugar into an effluent under conditions effective to reduce the concentration of nitrogen oxides in the effluent.

12 Claims, No Drawings

PROCESS FOR THE REDUCTION OF NITROGEN OXIDES IN AN EFFLUENT USING SUGAR

TECHNICAL FIELD

The present invention relates to a process for the reduction of nitrogen oxides ($NO_x$) in the effluent, especially the oxygen-rich effluent, from the combustion of a carbonaceous fuel by injection of a treatment agent comprising sugar into the effluent.

Carbonaceous fuels can be made to burn more completely, and with reduced emissions of carbon monoxide and unburned hydrocarbons, when the oxygen concentrations and air/fuel ratios employed are those which permit high flame temperatures. When fossil fuels are used to fire large utility boilers, temperatures above about 2000° F. and typically about 2200° F. to about 3000° F. are generated. Unfortunately, such high temperatures, as well as hot spots of higher temperatures, tend to cause the production of thermal $NO_x$, the temperatures being so high that free radicals of oxygen and nitrogen are formed and chemically combine as nitrogen oxides. Nitrogen oxides can form even in circulating fluidized bed boilers which operate at temperatures which typically range from 1300° F. to 1700° F.

Nitrogen oxides, especially $NO_2$, are troublesome pollutants which are found in the combustion effluent streams of boilers when fired as described above, and comprise a major irritant in smog. It is further believed that nitrogen oxides can undergo a process known as photo-chemical smog formation, through a series of reactions in the presence of sunlight and hydrocarbons. Moreover, nitrogen oxides comprise a major portion of acid rain.

Unfortunately, the temperatures within a utility or circulating fluidized bed boiler render most common methods of reducing $NO_x$ concentrations, such as effluent scrubbing or catalyst grids, either uneconomical, infeasible, or both.

BACKGROUND ART

Various methods and compositions for reducing the $NO_x$ concentration in the effluent from the combustion of a carbonaceous fuel have been proposed. For instance, Arand et al, in U.S. Pat. No. 4,208,386, disclose a method for reducing $NO_x$ in combustion effluents by injecting urea, either as a solid powder or in solution, at effluent temperatures in excess of 1300° F. The preferred urea solutions are those having at least 10 weight percent urea. For operation at temperatures below 1600° F., the use of reducing materials such as paraffinic, olefinic, aromatic and oxygenated hydrocarbons, as well as hydrogen, are requied.

Bowers, in copending and commonly assigned U.S. patent application Ser. No. 906,671, filed Sept. 10, 1986, now U.S. Pat. No. 4,751,065 discloses the use of a solution which comprises urea and hexamethylenetetramine (HMTA) to reduce the $NO_x$ concentration in oxygen-rich effluents having temperatures above 1300° F. Similarly, Bowers, in copending and commonly assigned U.S. patent application Ser. No. 784,828, filed Oct. 4, 1985, now U.S. Pat. No. 4,719,092 discloses a solution comprising urea and an oxygenated hydrocarbon solvent which is disclosed as being effective at reducing $NO_x$ concentrations with reduced ammonia slippage in effluents at temperatures above 1600° F.

In copending and commonly assigned U.S. patent application entitled "Process for Reducing Nitrogen Oxides in an Effluent Using a Hydrocarbon or Hydrogen Peroxide" having Ser. No. 022,799, filed Mar. 6, 1987, Sullivan discloses the use of hydrocarbons to reduce $NO_x$ levels in effluents at low temperatures (i.e., below 1450° F., especially below 1300° F.).

Although the prior art processes for reducing nitrogen oxides concentrations are generally effective, there exists a present need for a process which elicits still further $NO_x$ reductions in an economical and convenient manner.

DISCLOSURE OF INVENTION

The present invention relates to a process for reducing nitrogen oxides in the effluent from the combustion of a carbonaceous fuel. More particularly, the present invention relates to a process which comprises injecting into the effluent from the combustion of a carbonaceous fuel a treatment agent comprising sugar under conditions effective to reduce the nitrogen oxides concentration in the effluent. Most preferably, the sugar comprises sucrose.

For the purposes of this description, all temperatures herein are measured using an unshielded K-type thermocouple. Unless otherwise indicated, all parts and percentages are based on the weight of the composition at the particular point of reference.

The term "sugar" as used in this description refers to any useful saccharide or carbohydrate material or mixture thereof which is capable of decreasing the $NO_x$ concentration in an effluent under conditions as described herein, including non-reducing and reducing water soluble mono-saccharides and the reducing and non-reducing polysaccharides and their degradation products, such as pentoses including aldopentoses, methyl pentoses, keptopentoses like xylose and arabinose, deoxyaldoses like rhaminose, hexoses and reducing saccharides such as aldo hexoses like glucose, galactose and mannose, ketohexoses like fructose and sorbose, disaccharides like lactose and maltose, non-reducing disaccharides like sucrose and other polysaccharides such as dextrin and raffinose, hydrolyzed starches which contain as their constituents oligosaccharides, water dispersible polysaccharides and water soluble or dispersible cellulosic materials such as cellulose acetate.

The treatment agent of this invention most preferably further comprises urea. The term "urea" as used in this description includes the compound urea itself, as well as compounds equivalent in effect. Thus, unless otherwise specified, reference in this disclosure to urea should not be taken as limiting to urea itself, but should extend to urea and all of its equivalents. It is pointed out that the term equivalent is not limited to exact equivalents, and various equivalents will be optimally operable at some conditions which are different than those for other equivalents. Moreover, some equivalents may be more effective than others.

Advantageously, the treatment agent of this invention is injected into the effluent in solution. Aqueous solutions are preferred due to their economy and the fact that they can be employed with suitable effectiveness in most situations. The effective solutions will range from saturated to dilute. While water is an effective solvent for most applications, it will be recognized that there may be instances where other solvents may be advantageously used, either alone or in combination with water, as would be known to the skilled artisan.

The level of sugar present in the solution is advantageously in the range of about 0.5% to about 30% by weight, preferably about 5% to about 20% by weight. Where urea is employed in the treatment agent, it should preferably be present in the solution in the range of about 2% to about 60%, most preferably about 5% to about 30% by weight. The weight ratio of sugar to urea, when urea is used with sugar as the treatment agent in solution, should advantageously be about 1:10 to about 4:1, more preferably about 1:5 to about 3:1. The most preferred weight ratio of sugar to urea in the solution is about 1:4 to about 2.5:1.

The temperature of the effluent at the point of injection will have an influence on the concentration of the solution. At temperatures of about 1300° F. to about 1700° F., the solution will tend to operate effectively at high concentration, e.g., about 10% to about 65% by weight treatment agent. On the other hand, at temperatures in excess of about 1700° F., the solution will tend more towards dilute. At these higher temperatures, water (or the solvent in case of non-aqueous solutions) may comprise greater than 80%, 85% or even 90% by weight of the solution.

The treatment agent of this invention is preferably injected into the effluent in an amount effective to elicit a reduction in the nitrogen oxides concentration in the effluent. Advantageously, the treatment agent of this invention is injected into the effluent in an amount sufficient to provide a molar ratio of the nitrogen contained in the treatment agent to the baseline nitrogen oxides level of about 1:5 to about 10:1. More preferably, the treatment agent is injected into the effluent to provide a molar ratio of treatment agent nitrogen to baseline nitrogen oxides level of about 1:3 to about 5:1, most preferably about 1:2 to about 3:1. Where urea is not present in the treatment agent, the treatment agent is preferably injected into the effluent to provide the weight ratio of treatment agent to the baseline nitrogen oxides level of about 1:5 to about 10:1.

In situations where the treatment agent comprises urea as well as sugar, the injection ratio can alternatively be expressed as the normalized stoichiometric ratio (NSR) of the treatment agent to the baseline nitrogen oxides level. Normalized stoichiometric ratio is the ratio of the concentration of $NH_x$ radicals ($NH_x$ radicals, with x being an integer, are believed to be the moiety contributed by urea which facilitates the series of reactions resulting in $NO_x$ breakdown) to the concentration of nitrogen oxides in the effluent and can be expressed as $[NH_x]/[NO_x]$.

The treatment agent, whether in solution or injected in pure form, is preferably injected into the effluent gas stream at a point where the effluent is at a temperature above about 1300° F., more preferably above about 1400° F., most preferably above about 1450° F. Large industrial and circulating fluidized bed boilers of the types employed for utility power plants and other large facilities will typically have access only at limited points. In the most typical situations, the boiler interior in the area above the flame operates at temperatures which at full load approach 1900° F., even 2000° F. After subsequent heat exchange, the temperature will be lower, usually in the range between about 1300° F. and 1900° F. At these temperatures, the treatment agent of this invention can be effectively introduced to accomplish substantial reduction of nitrogen oxides in the effluent.

The treatment agent utilized according to this invention is preferably injected at a number of spaced positions from nozzles or other apparatus which are effective to uniformly distribute the treatment agent through the combustion effluent.

The effluent into which the treatment agent of this invention is injected is preferably oxygen-rich, meaning that there is an excess of oxygen in the effluent. Advantageously, the excess of oxygen is greater than about 1% by volume. Most preferably, the excess of oxygen is in the range of about 1% to about 12% or greater by volume.

It will be understood that the $NO_x$ reducing treatment agents of this invention are useful not only where substantial nitrogen oxides reductions are accomplished by directly applying the disclosed method as the principal $NO_x$ reducing method, but can also be employed as a discrete step in combination with other chemical, catalytic or other procedures for reducing nitrogen oxides concentrations as well as other pollutants such as sulfur dioxide ($SO_2$), while preferably controlling levels of residual pollutants such as ammonia and/or carbon monoxide. Such a suitable "multi-step" process is disclosed in copending and commonly assigned U.S. patent application entitled "Multi-Stage Process for Reducing the Concentration of Pollutants in an Effluent" having Ser. No. 022,716, filed in the names of Epperly, Peter-Hoblyn, Shulof and Sullivan on Mar. 6, 1987, now U.S. Pat. No. 4,777,024 the disclosure of which is incorporated herein by reference.

An advantageous aspect of the practice of this invention is in the reduced production of other pollutants, such as ammonia and carbon monoxide, during the nitrogen oxides reduction process. The presence of ammonia in the effluent should be avoided because, among other reasons, it can react with $SO_3^=$ to form ammonium bisulfate which can foul heat exchange surfaces in a boiler. Moreover, ammonia has detrimental effects on ambient air quality, as has carbon monoxide. The reason for the lower levels of ammonia and carbon monoxide is not fully understood but is probably because the series of reactions involving sugar, urea and $NO_x$ which lead to the reduction of $NO_x$ concentrations simply does not produce substantial amounts of other pollutants as byproducts.

The following examples further illustrate and explain the invention by detailing the operation of a treatment agent comprising sugar in the reduction of nitrogen oxides emissions.

EXAMPLE I

The burner used is a burner having an effluent flue conduit, known as a combustion tunnel, approximately 209 inches in length and having an internal diameter of 8 inches and walls 2 inches thick. The burner has a flame area adjacent the effluent entry port and flue gas monitors adjacent the effluent exit port to measure the concentration of compositions such as nitrogen oxidss, sulfur oxides, ammonia, carbon monoxide, carbon dioxide, percent excess oxygen and other compounds of interest which may be present in the effluent. The effluent flue conduit additionally has thermocouple ports for temperature measurement at various locations. The temperature of the effluent into which the treatment agents are injected is measured at the point of injection utilizing a K-type thermocouple. Atomizing injectors described in copending and commonly assigned U.S. patent application entitled "Process and Apparatus for Reducing the Concentration of Pollutants in an Effluent", Ser. No. 009,696, filed in the name of Burton on Feb. 2, 1987, now U.S. Pat. No. 4,842,834, the disclosure which is incorporated herein by reference, are positioned through ports in the effluent flue conduit in order to introduce and distribute the treatment agents into the effluent stream. The burner fuel is a Number 2 fuel oil, and the burner is fired at a rate of 8.8 to 9.6 lbs/hr.

A baseline nitrogen oxides concentration reading is taken prior to beginning each run to calculate the injection ratio of treatment agent to baseline nitrogen oxides and the NSR (when appropriate), and a final nitrogen oxides reading is taken during and downstream from injection of the treatment agents to calculate the reduction in the nitrogen oxides concentration in the effluent elicited by each of the treatment agents injected.

The following runs are made:

1. An aqueous solution comprising 15% by weight of sucrose is injected at a rate of 300 ml/hr. into the effluent at a temperature of 1330° F. and an excess of oxygen of 3.2%. The results are set out in Table 1.

2. An aqueous solution comprising 10% by weight of urea, 15% by weight of sucrose and 0.1% by weight of a commercially available surfactant is injected at a rate of 200 ml/hr. into the effluent at a temperature of 1580° F. and an excess of oxygen of 3.1% to proide an NSR of 1.44. The results are set out in Table 1.

3. An aqueous solution comprising 10% by weight of urea, 15% by weight of sucrose and 0.1% by weight of a commercially available surfactant is injected at a rate of 150 ml/hr. into the effluent at a temperature of 1580° F. and an excess of oxygen of 3.3% to provide an NSR of 1.07. The results are set out in Table 1.

4. An aqueous solution comprising 10% by weight of urea, 15% by weight of sucrose and 0.1% by weight of a commercially available surfactant is injected at a rate of 100 ml/hr. into the effluent at a temperature of 1580° F. and an excess of oxygen of 3.3% to provide an NSR of 0.70. The results are set out in Table 1.

5. An aqueous solution comprising 10% by weight of urea, 15% by weight of sucrose and 0.1% by weight of a commercially available surfactant is injected at a rate of 200 ml/hr. into the effluent at a temperature of 1570° F. and an excess of oxygen of 4.4% to provide an NSR of 1.31. The results are set out in Table 1.

6. An aqueous solution comprising 10% by weight of urea, 15% by weight of sucrose and 0.1% by weight of a commercially available surfactant is injected at a rate of 200 ml/hr. into the effluent at a temperature of 1555° F. and an excess of oxygen of 6.0% to provide an NSR of 1.29. The results are set out in Table 1.

7. An aqueous solution comprising 10% by weight of urea, 15% by weight of cellulose acetate and 0.1% by weight of a commercially available surfactant is injected at a rate of 300 ml/hr. into the effluent at a temperature of 1510° F. and an excess of oxygen of 3.2% to provide an NSR of 2.31. The results are set out in Table 1.

8. An aqueous solution comprising 10% by weight of urea, 15% by weight of corn syrup and 0.1% by weight of a commercially available surfactant is injected at a rate of 300 ml/hr. into the effluent at a temperature of 1500° F. and an excess of oxygen of 3.1% to provide an NSR of 2.33. The results are set out in Table 1.

TABLE 1

| Run | $NO_x$ (ppm) Baseline | $NO_x$ (ppm) Final | % Red. | $NH_3$ (ppm) |
| --- | --- | --- | --- | --- |
| 1 | 132 | 74 | 43.9 | — |
| 2 | 165 | 92 | 44.2 | 28 |
| 3 | 165 | 100 | 39.4 | 9 |
| 4 | 167 | 132 | 21.0 | 3 |
| 5 | 169 | 99 | 41.4 | 11 |
| 6 | 155 | 105 | 32.3 | 10 |
| 7 | 168 | 112 | 33.3 | 45 |
| 8 | 167 | 102 | 38.9 | — |

It is clear from Table 1 that the injection of sugar into an effluent, especially in the presence of urea, leads to significant reductions in the nitrogen oxides concentration of the effluent, while substantially avoiding the production of other pollutants, such as ammonia.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

We claim:

1. A process for the reduction of the concentration of nitrogen oxides in the oxygen-rich effluent from the combustion of a carbonaceous fuel, the process comprising injecting a treatment agent which comprises urea and sugar into an effluent having a temperature of greater than about 1300° F. under conditions effective to reduce the concentration of nitrogen oxides in the effluent.

2. The process of claim 1 wherein said sugar comprises sucrose.

3. The process of claim 2 wherein the effluent is at a temperature of greater than about 1450° F.

4. The process of claim 2 wherein the temperature of the effluent is below about 2000° F.

5. The process of claim 2 wherein said treatment agent is in solution.

6. The process of claim 5 wherein said solution comprises an aqueous solution.

7. The process of claim 6 wherein urea is present in said solution in an amount of about 2% to about 60% by weight.

8. The process of claim 7 wherein sugar is present in said solution in an amount of about 0.5% to about 25% by weight.

9. The process of claim 3 wherein said treatment agent is injected into the effluent at a molar ratio of the nitrogen contained in said treatment agent to the baseline nitrogen oxides level of about 1:5 to about 10:1.

10. The process of claim 9 wherein the molar ratio of treatment agent nitrogen to baseline nitrogen oxides level is about 1:3 to about 5:1.

11. The process of claim 1 wherein said effluent has an excess of oxygen of no greater than about 12% by volume.

12. A process for the reduction of the concentration of nitrogen oxides in the oxygen-rich effluent from the combustion of a carbonaceous fuel, the process comprising injecting a treatment agent which comprises an aqueous solution of about 2% to about 60% urea by weight and about 0.5% to about 25% sugar by weight into an effluent having an excess of oxygen of about 1% to about 6% by volume and a temperature of about 1450° F. to about 1900° F. in an amount sufficient to provide a molar ratio of the nitrogen contained in said treatment agent to the baseline nitrogen oxides level of about 1:3 to about 5:1 under conditions effective to reduce the concentration of nitrogen oxides in the effluent.

* * * * *